United States Patent [19]
De Backer et al.

[11] 4,382,274
[45] May 3, 1983

[54] FLUSH RUNWAY INSET TOP ASSEMBLY FOR AIRPORT GUIDANCE LIGHT APPARATUS AND GUIDANCE LIGHT APPARATUS COMPRISING A TOP ASSEMBLY OF THIS TYPE

[75] Inventors: Jean A. De Backer, Brussels; Jacques L. Yperman, Kraainem, both of Belgium

[73] Assignee: Societe Anonyme des Etablissements Adrien De Backer, Belgium

[21] Appl. No.: 330,814

[22] Filed: Dec. 15, 1981

[51] Int. Cl.$^3$ .............................................. F21S 1/02
[52] U.S. Cl. .................................. 362/153; 362/364; 362/365; 362/390; 362/244; 340/815.01
[58] Field of Search ............... 362/153, 364, 365, 390, 362/244; 340/366 F

[56] References Cited
U.S. PATENT DOCUMENTS 3,007,034 10/1961 Reed et al. ......................... 362/153
3,113,726 12/1963 Pennow et al. ..................... 362/153
3,200,243 8/1965 McDevitt et al. ................... 362/153

Primary Examiner—Stephen J. Lechert, Jr.
Attorney, Agent, or Firm—Fred A. Keire

[57] ABSTRACT

A top assembly which comprises a cover assembly having a circular shape with a flat surface and having apertures for securement on top of the light base, said cover assembly having at least one window fitted with optical prism or lens means for the passage of each output light beam from an optical system, and further having a draining aperture in front of each said window; and at least one light channel plate to be mounted adjacent the cover assembly in coaxial alignment with the optical axis of the apparatus, said channel plate having an elongated shape with circular arcuate end sides, the curvature of a first of said end sides mating with the curvature of the peripheral edge of the cover assembly so as to be placed adjacent said peripheral edge. The cover assembly has cover inner means secured to the underside of it to form with said cover assembly a water-tight enclosure for the optical system.

9 Claims, 3 Drawing Figures

FLUSH RUNWAY INSET TOP ASSEMBLY FOR AIRPORT GUIDANCE LIGHT APPARATUS AND GUIDANCE LIGHT APPARATUS COMPRISING A TOP ASSEMBLY OF THIS TYPE

BACKGROUND OF THE INVENTION

The present invention relates to a flush airport runway guidance light apparatus and more particularly to a top assembly to be used with a standard light base and designed to be installed flush in the runway.

The known lighting apparatus of the flush runway type are apparatus which have to be manufactured and mounted on special order and which require tailored work to prepare the runway for setting the apparatus flush therein. Such a proceeding is expensive and time-consuming.

Another problem with the known lighting apparatus of the flush runway type is the one concerned with the efficient removal of water collected in front of the light beam window(s) and assuring a suitable water-tightness to prevent water entering the optical system.

SUMMARY OF THE INVENTION

A first object of the invention is to provide a top assembly for an airport guidance light, designed to be mounted really flush in the runway without part protruding above the pavement and which can be used with a standard cylindrical light base.

Another object of this invention is a flush runway inset top assembly for a guidance light, specially designed for efficient draining off of the collected water and for assuring a perfect and permanent water-tightness to protect the optical system.

A further object of the invention is a flush runway lighting apparatus which comprises the top assembly in accordance with the invention, adapted on top of a cylindrical steel light base.

In accordance with the invention the runway inset top assembly comprises a cover assembly having a circular shape with a flat top surface and having apertures for securement on top of the light base, said cover assembly having at least one window fitted with optical prism or lens means for the passage of each output light beam from an optical system, and further having a draining aperture in front of each said window; and at least one light channel plate to be mounted adjacent the cover assembly in coaxial alignment with the optical axis of the apparatus, said channel plate having an elongated shape with circular arcuate end sides, the curvature of a first of said end sides mating with the curvature of the peripheral edge of the cover assembly so as to be placed adjacent said peripheral edge. The cover assembly has cover inner means secured to the underside of it to form with said cover assembly a water-tight enclosure for the optical system.

Each channel plate is formed with a longitudinal channel to be in coaxial alignment with said a least one window in the cover assembly for guiding the output light beam passing through said window, with the longitudinal edges and the outer end side of said plate being flush with the flat top surface of the cover assembly, and said channel plate further having apertures for securement in the runway.

The particulars of the invention will become fully apparent from the description hereinafter of an exemplary embodiment illustrated in the appended drawings.

DESCRIPTION OF AN EXEMPLARY EMBODIMENT

Figure 1:
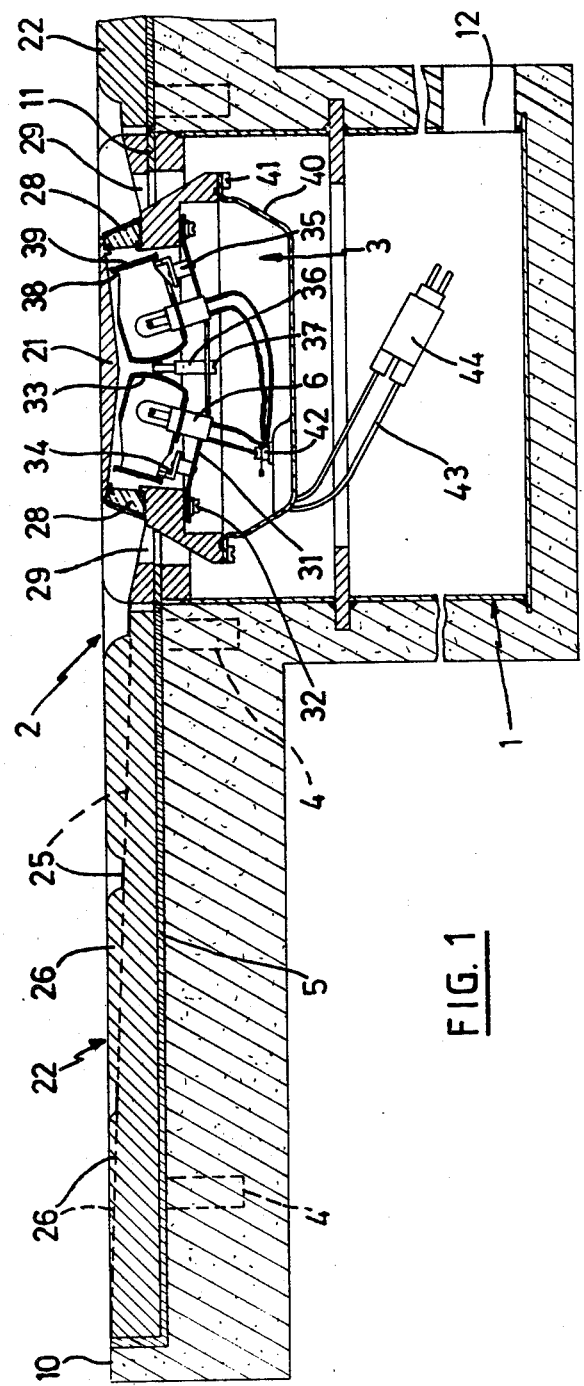
FIG. 1 is a cross-sectional view of a guidance light apparatus equipped with a top assembly according to the invention mounted flush in a runway.

Referring to FIG. 1 there is shown an embodiment of the invention in the form of a bidirectional guidance light apparatus. The numeral 1 denotes a standard cylindrical light base, e.g. a 12" diameter steel base. The base 1 is shown embedded in a runway, the pavement of which is denoted 10. The base 1 has a flange ring 11 and at least one port 12 for the passage of the power feed cable (not shown) and possibly a drainage tube. On top of base 1 there is shown a top assembly in accordance with this invention, generally denoted 2, designed and positioned so as to be mounted flush in the runway without part protruding above the pavement 10.

Figure 2:
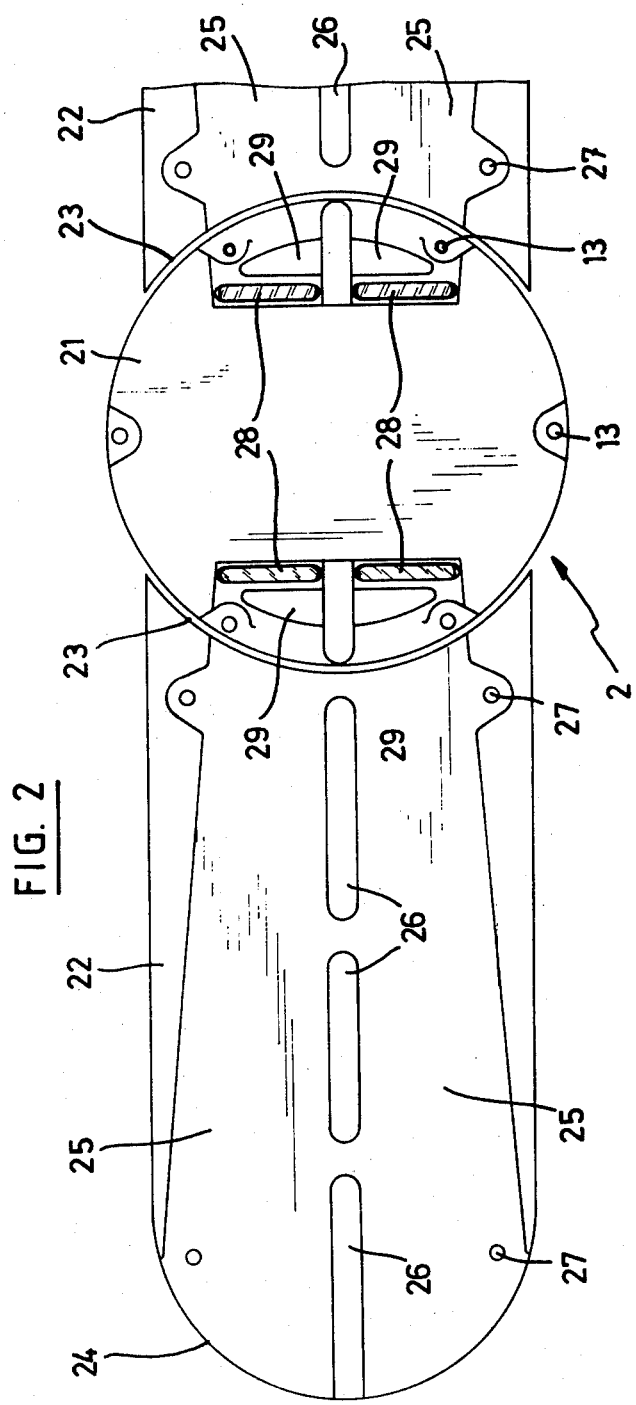
FIG. 2 is a plan view of the top assembly shown in FIG. 1.

The top assembly 2 in the exemplary embodiment shown, is comprised of a cover assembly 21 having an optical system 3 suspended to the underside of it, and two light channel plates 22 for guiding the output light beams. For a unidirectional lighting apparatus the top assembly 2 would comprise one light channel plate only associated with the cover assembly. The cover assembly 21 is supported by the flange ring 11 and has a flat top surface 20. The cover assembly 21 has a circular shape as shown in FIG. 2, adapted to fit the top opening of the base 1 and it has two windows fitted each with a prism or lens 28 for the passage of the output light beam from the suspended optical system.

The cover assembly 21 is formed with a draining aperture 29 located in front of each of said windows. These draining apertures serve to allow water collected in the channels 25 of plates 22 to run off to the bottom of the base 1 for being evacuated from there through the cable or draining tubing. A drain duct can be connected to each aperture 29 for guiding the collected water to the bottom of the base 1. The cover assembly 21 has six apertures 13 for securement to the flange ring 11 of the base 1 by means of bolts.

A cover inner 40 is secured by four screws 41 to the underside of the cover assembly 21 with interposition of sealing joint means to form with said cover a watertight enclosure for the optical system 3.

The channel plates 22 extend coaxial with the optical axis of the apparatus on either side of the cover assembly 21. Each channel plate 22 has a generally rectangular shape with circular arcuate sides 23,24 transversal to the optical axis of the apparatus. Advantageously, the radius of the end arcs of the circle is a standard radius dimension for current light bases, e.g. 8", 10", . . . This shape of the channel plates 22 allows the runway to be drilled out with the same usual machine as used for drilling a base hole. The channel plates 22 are formed with a longitudinal channel 25 extending in coaxial alignment with the optical axis of each prism or lens in the cover assembly 21. In the embodiment illustrated, each plate 22 has two channels 25 separated by a line of ribs 26 having a flat top surface even with the pavement 10. The bottom of each channel 25 is inclined down towards its end adjacent the cover assembly 21 at a suitable angle, e.g. two degrees approximately, to the horizontal plane. The channel plates 22 are provided with four apertures 27 for securement in a recess in the runway by means of bolts 4. The recess in the runway is preferably fitted with an epoxy sealing 5 prior to accomodation of the plate(s) 22 therein.

Figure 3:
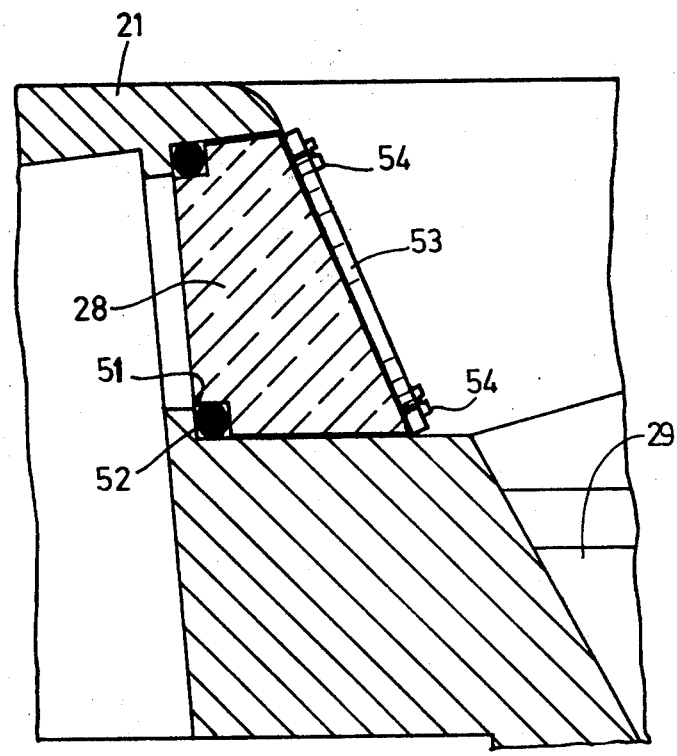
FIG. 3 is a view showing the particular mounting arrangement of an optical prism or lens in the top assembly according to the invention.

The sealed mounting arrangement for the prisms or lens 28 in the cover assembly 21 is illustrated in more detail on the enlarged view of FIG. 3. The prisms are mounted and secured by mechanical assembling instead of the usual filling cement. According to a further aspect of the invention, the peripheral edge of the prism or lens 28 in a plane transversal to the optical axis is formed with a continuous groove 51 adapted to accomodate a removable sealing ring 52 made of compressible material and having prior to mounting with the prism in the cover aperture, a thickness greater than the interspace between the bottom of said groove 51 and the aperture wall. This method of mounting the prism or lens in its aperture in the cover assembly 21 permits a substantial saving in labour and allows the easy replacement of deteriorate prism or lens. Further, due to the sealing ring 52 being permanently in a compressed state, a perfect sealing is still guaranteed by contrast with the usual sealing by means of cement which is subject to continuous aging resulting in a fast growing deterioration. Securement is perfected by means of lateral clams 53 fixed by screws 54.

The optical system 3 is secured on a mounting bracket 31 secured to the underside of the cover 21 by eight grommets 32. The mounting bracket 31 has two apertures for insertion of the lamp supports 6 having lugs for fixation to the mounting bracket 31. Each reflector 33 is mounted on a bracket 34 which is secured to bracket 31 by means of four stand-off assemblies 35. The reflectors 33 are maintained in position by a common stand-off piece 36 secured to the mounting bracket 31 by a washer lock 37. To each reflector bracket 34 is secured another bracket 38 for mounting a filter 39. The cover inner 40 supports insulated terminals for the connection of the lamp support leads to the bipolar cable 43 having a junction box 44 at its end.

What is claimed is:

1. A runway inset top assembly for use with a cylindrical airport light base so as to be set flush with the pavement, comprising:
   a cover assembly having a circular shape with a flat top surface and having apertures for securement on top of the light base,
   said cover assembly having at least one window fitted with optical prism or lens means for the passage of each output light beam from an optical system, said cover assembly further having a draining aperture in front of each said window; and
   at least one light channel plate to be mounted adjacent the cover assembly in coaxial alignment with the optical axis of the apparatus, said channel plate having an elongated shape with circular arcuate end sides, the curvature of a first of said end sides mating with the curvature of the peripheral edge of the cover assembly so as to be placed adjacent said peripheral edge, said channel plate being formed with a longitudinal channel to be in coaxial alignment with said at least one window in the cover assembly for guiding the output light beam passing through said window, with the longitudinal edges and the outer end side of said plate being flush with the flat top surface of the cover assembly, and said channel plate further having apertures for securement in the runway.

2. A top assembly according to claim 1, wherein the at least one channel plate is formed with a pair of longitudinal channels for guiding the light output beam, with the inner edges of said channels being connected by at least one rib having a flat top surface even with the longitudinal edges of the plate and the top surface of the cover assembly.

3. A top assembly according to claim 1, wherein the mounting arrangement for the optical prism or lens means in a window of the cover assembly comprises a peripheral groove formed in said optical prism or lens means in a plane transversal to the optical axis, and a sealing ring of a compressible material housed in said groove, the sealing ring having a radial width greater than the space between the bottom of said groove and the window wall thereby to seal the optical prism or lens in the window by a permanent radial force and whereby the said optical prism or lens is secured by mechanical means only.

4. A top assembly according to either of claims 1 to 3, wherein the cover assembly has an optical system suspended to the underside of it, and cover inner means secured to the underside of the cover assembly so as to form with the cover assembly a water-tight enclosure for the optical system.

5. A top assembly according to either of claims 1 to 3, wherein the cover assembly has a mounting bracket secured to the underside of it, said mounting bracket supporting an optical system, and cover inner means secured to the underside of the cover assembly so as to form a water-tight enclosure for the optical system.

6. A flush runway guidance light apparatus comprising: a cylindrical steel base embedded in the runway, said base having a flange ring for supporting a top cover flush with the pavement, and a runway inset top assembly comprising
   a cover assembly having a circular shape with a flat top surface and being secured on said flange ring of the base, said cover assembly having an optical system suspended to the underside of it with cover inner means secured to the underside of the cover assembly to form a water-tight enclosure for said optical system,
   said cover assembly having at least one window with optical prism or lens means sealed therein for the passage of each output light beam from the optical system,
   said cover assembly further having a draining aperture in front of each said window; and
   at least one channel plate mounted coaxial with the optical axis adjacent the cover assembly,
   said channel plate having an elongated shape with circular arcuate end sides, the curvature of a first of said end sides mating with the curvature of the peripheral edge of the cover assembly so as to be adjacent thereto,
   said channel plate being formed with a longitudinal channel in alignment with said at least one window in the cover assembly for guiding the output light beam passing through said window, with the longitudinal edges and the outer end side of said plate being flush with the flat top surface of the cover assembly and the runway pavement,
   said channel plate being secured in the runway.

7. A guidance light apparatus according to claim 6, wherein the at least one channel plate is formed with a pair of longitudinal channels for guiding the light output beam, with the inner edges of said channels being connected by at least one rib having a flat top surface even with the longitudinal edges of the plate and the top surface of the cover assembly.

8. A guidance light apparatus according to either of claims 6 and 7, wherein the at least one channel plate is secured in the runway with interposition of a sealing fitting.

9. A guidance light apparatus according to claim 6, wherein the mounting arrangement for the optical prism or lens means in a window of the cover assembly comprises a peripheral groove formed in the optical prism or lens means in a plane transversal to the optical axis, and a sealing ring of a compressible material housed in said groove, the sealing ring having a radial width greater than the space between the bottom of said groove and the window wall thereby to seal the optical prism or lens means in the window by a radial force and whereby said optical prism or lens means is secured by mechanical means only.

* * * * *